United States Patent [19]

Meriläinen et al.

[11] 4,123,169

[45] Oct. 31, 1978

[54] DEVICE FOR MEASURING THE WIDTH OF TIMBER

[75] Inventors: Heikki Meriläinen, Karhula; Ulf J. G. Ström, Grankulla, both of Finland

[73] Assignee: A. Ahlstrom Osakeyhtio, Finland

[21] Appl. No.: 768,402

[22] Filed: Feb. 14, 1977

[30] Foreign Application Priority Data

Feb. 20, 1976 [FI] Finland ............................... 760438

[51] Int. Cl.² ............................................. G01B 11/02
[52] U.S. Cl. .................................. 356/167; 356/160; 356/199
[58] Field of Search ................ 356/159, 160, 167, 158, 356/199, 200; 250/571, 572

[56] References Cited

U.S. PATENT DOCUMENTS

| | | | |
|---|---|---|---|
| 2,674,917 | 4/1954 | Summerhayes | 356/160 |
| 3,470,383 | 9/1969 | Persson et al. | 356/160 |
| 3,513,321 | 5/1970 | Sherman | 356/160 |
| 3,698,818 | 10/1972 | Bowker et al. | 356/160 |
| 3,886,372 | 5/1975 | Sanglert | 356/167 |

Primary Examiner—John K. Corbin
Assistant Examiner—R. A. Rosenberger
Attorney, Agent, or Firm—Bucknam and Archer

[57] ABSTRACT

The width of a piece of timber, such as a board is measured with a device including a laser tube emitting laser beam to be reflected by a rotatable mirror polyhedron and a parabolic reflector into a direction along the board, mirror rasters being provided at intervals along the board so as to reflect laser beam pulses onto the board, each raster including a group of mirrors reflecting the beam pulses onto spots of the board that are spaced apart laterally across the board, and detecting means being provided for receiving the pulses reflected from the board surface in order to obtain information about the board width. Preferably, the pulses received by the detectors are transferred to a computer which calculates, in a manner known per se, the optimal sawing width for the board. Instead of the reflector, lens means may be used for directing the beam along the board.

5 Claims, 6 Drawing Figures

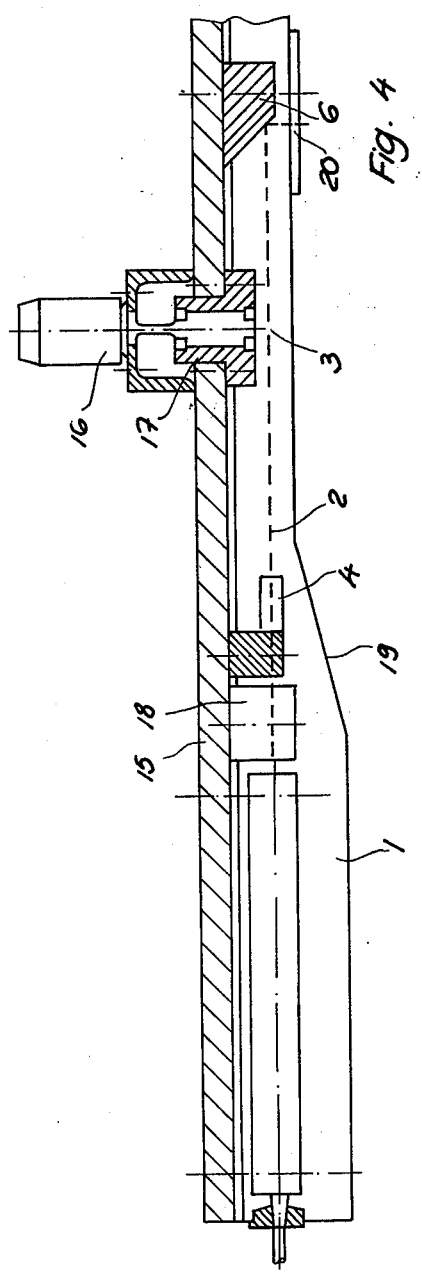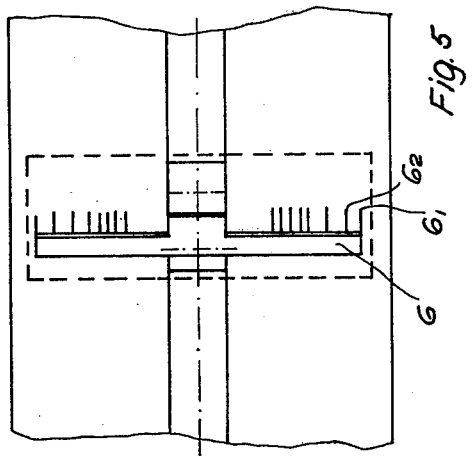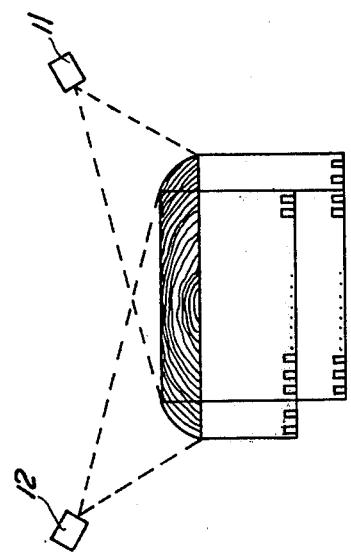

DEVICE FOR MEASURING THE WIDTH OF TIMBER

BACKGROUND OF THE INVENTION

1. Field of the Invention

The present invention relates to a device by means of which the shape of a deficient-edged board, beam, or other such timber can be determined and which can be used, with the aid of a computer, to control the board-directing device and the setting of the width in an edge-trimming device so that an optimal quantity of timber is obtained from the board to be trimmed.

2. DESCRIPTION OF THE PRIOR ART

It is prior known, e.g. from the Swedish Pat. No. 307,443 to pass the board by light sources that illuminate the board and provide pulses from the sawn surface as well as from the wanes of the board, said pulses being received by detectors positioned on the opposite side of the board to be measured. The device is suitable for use as positioned directly in the trimming line, where optimization is carried out by adjusting the saw blades. Also, the relatively long distance between the measuring point and the trimming blades, as well as an eventually necessary stopping of the board, tends to increase the inaccuracy of the device.

In order to minimize the distance between the measuring point and the trimming point, it has been suggested to transfer the board laterally upon measuring. In such device it is known to use instead of light sources, a measuring head positioned closely onto the surface of the board and blowing pressurized air onto the board. Detectors sensing reflected air can hereby detect whether the board surface is undefected or not. The object of the invention is to provide a device for determining the shape of a deficient-edged board, suitable for use especially in edge-trimming systems in which a board is optimized on a measuring line parallel to the trimming line, the measuring information providing the necessary data and controlling the selection before the transversal transfer, whereby the board maintains its direction when transferred to the trimming line. Such a transversal mechanism and trimming line have been disclosed in the U.S. application, Ser. No. 709,389, filed on July 28, 1976, and hereby incorporated by reference.

SUMMARY OF THE INVENTION

The invention is based on the use of a laser beam and a mirror system, which makes, for example, very rapid measurements possible. The other advantages of the invention include the small number of moving parts and low maintenance costs.

The invention provided a device of the character once described, which comprises a laser tube emitting a beam of laser radiation; a rotating mirror polyhedron positioned so as to received said laser beam; optical means, such as a parabolic reflector so positioned that said mirror polyheder is at the focal point of the reflector and that the reflector reflects the laser beam from the mirror polyheder in a direction along said board; a plurality of mirror rasters positioned as mirror groups successively at desired intervals along the length of the board at a certain distance therefrom and at a suitable angle so as to reflect the laser beam coming from the parabolic reflector onto parts of the board that are situated stepwise in the lateral direction of the board; and a plurality of detectors including at least one detector at each measuring point, as defined by said group of mirrors, and arranged to receive laser pulses reflected from the board surface, thus providing information about the board width at said measuring point.

BRIEF DESCRIPTION OF THE DRAWINGS

FIGS. 1, 2, and 3 illustrate the principle of the method according to the invention and depict a top view, a side view, and a cross section of the board to be measured;

FIG. 4 depicts a side view of the device, partially as a section;

FIG. 5 depicts one point in FIG. 4, seen in the direction of arrow A; and

DESCRIPTION OF THE PREFERRED EMBODIMENTS

Figure 1:
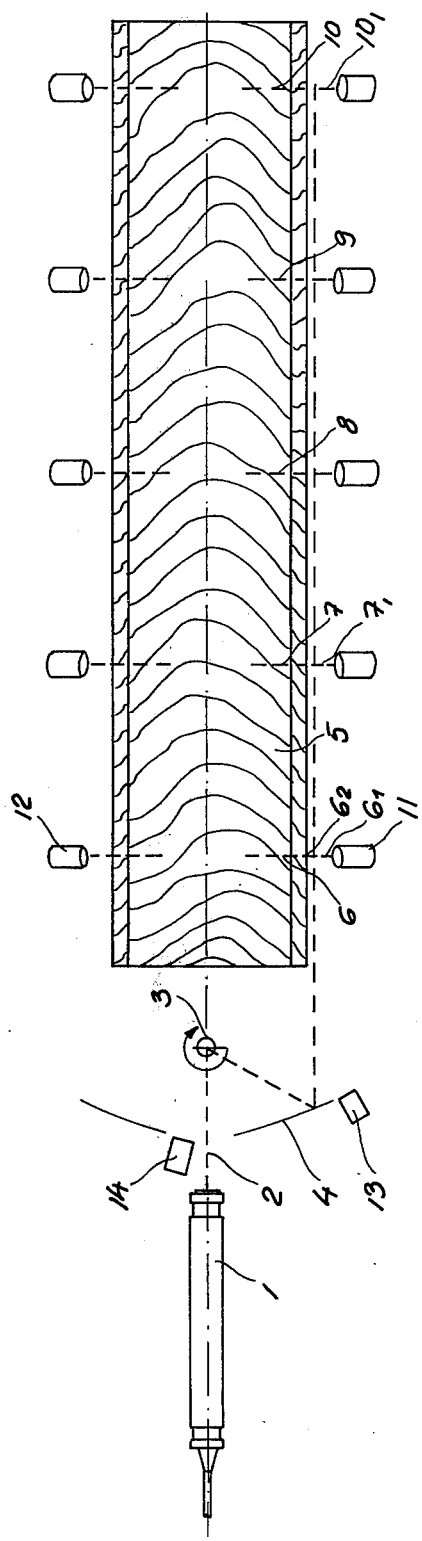
Figure 2:
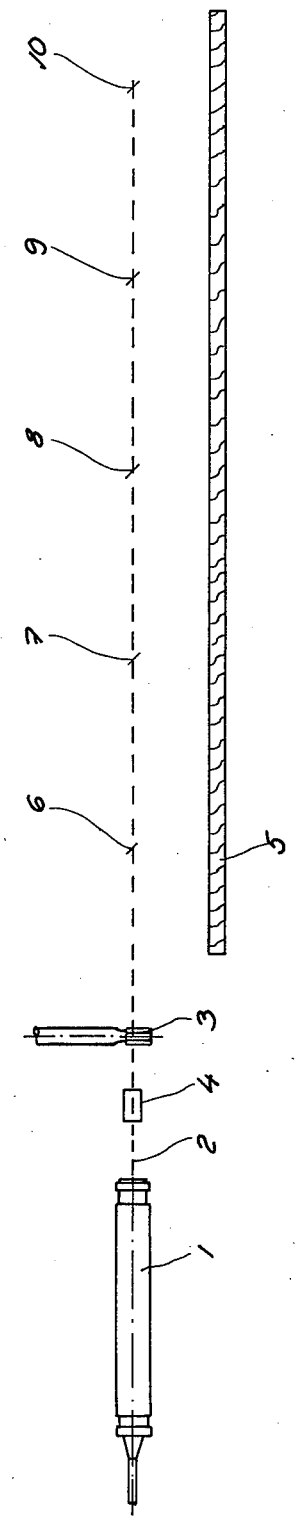

FIGS. 1 and 2 show a laser tube 1. A laser beam 2 is emitted and reflected via a rotating mirror polyhedron (or mirror prism) 3 at the focal point of a parabolic reflector 4 onto the reflector surface. Thus a parallel scan with the same width as the width of the parabolic reflector is produced over the board 5 to be measured.

The beam 2 is reflected by means of successive mirror rasters 6, 7, 8, 9, and 10, positioned at a suitable angle, for example 45°, onto the surface of the board 5. The rasters are placed in relation to the laser beam in such a manner that after the first mirror 6 at the first measuring point the beam hits the first mirror $7_1$ of the second measuring point, etc., until after the first mirror $10_1$ of the last measuring point the beam hits the second mirror $6_2$ of the first measuring point, etc. In this manner a progressive light impulse is obtained at each measuring point; it has the length of the reflecting part of the mirror raster and hits the board surface at the point of the trimming width on both sides of the measuring line.

The light impulses are received by two detectors 11 and 12 at each measuring point. As shown in FIG. 3, the detectors above the board are placed and directed so that each detector "sees" the upper surface of the board and one deficient edge at one measuring point. By combining the light impulses detected on the board surface by the detectors the necessary information for the optimization is obtained concerning the width of the plane surface of the board and the width of each deficient edge at the measuring point.

If the information about the width of the plane surface part suffices, detectors are used alternately so that the right-side detector operates when the light impulses scan the left side of the board and vice versa.

For distinguishing between two successive measurements and between the measuring information concerning the two sides, initial and midway impulses are necessary. They are obtained for example, as in the present description, by means of detectors 13 and 14 from the beam reflected from the mirror polyhedron.

The device is illustrated in more detail in FIGS. 4 and 5. A laser tube 1, a parabolic reflector 4, a driving motor 16 and bearings 17 for the rotating mirror polyhedron 3, and mirror rasters 6-10 have been attached to a beam 15. Between the laser tube and the parabolic reflector there has been fitted a lens device 18, not shown in more detail, which converts the circular cross section of the laser beam into a vertical rectangle, or ellipse, in which case the width of the mirrors of the raster and the distance between the mirrors can be diminished. The distance between the mirrors is selected according to the graduation of the desired trimming width. Also attached to the beam 15 is a shield 19 with apertures 20 through which the laser beam reflected by the mirrors 6–10 can pass.

Figure 6:
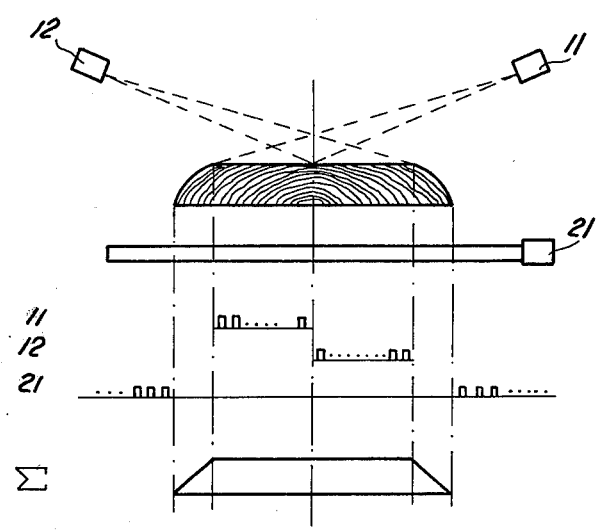
FIG. 6 shows an alternative arrangement of the detectors.

FIG. 6 shows, analogously to FIG. 3, an alternative placement of the detectors. In this alternative a third detector 21, which has been placed, for example, at the end of a plexiglass bar which collects impulses and extends across the board, is used in addition to the detectors 11 and 12, in order to measure the beams passing the board. The timing of the impulses on the different sides is obtained from the timing of the entire measuring system, by a method known per se. The impulses received by the different detectors and the observation made by the detectors together (2) concerning the cross-section shape of the board are shown schematically in the lower part of the Figure. The advantages of this arrangement over the twodetector system described are substantially as follows:

- the beams reflected from the deficient edges, which are often quite dark, need not be measured
- the laser beam can be measured directly by means of the detector 21
- the acceptance angles of the detectors 11 and 12 can be reduced
- the observation of a full edge is facilitated (when the same edge is observed by means of two detectors), provided that a deficient edge is not facing downwards
- since the measurement of the passing (straight) impulses is easier, a control criterion is thereby obtained for the measurement results from the upper side The measuring frequency depends on the number of revolutions of the rotating mirror shaft and on the number of mirror surfaces. A frequency of 100 Hz is obtained with a quadrangle mirror if the motor speed is 1500 r/min.

The measuring information is interpreted so that one additional impulse corresponds to an increase of one trimming width; i.e., if, for example, two impulses arrive from the lefthand side plane surface of the board, as shown in FIG. 3, and three arrive from the right side, the information corresponds on the left side of the plane surface part to the second narrowest trimming width and on the right side of the plane surface part to the third narrowest. The impulses are transferred to the computer, which for example calculates the optimal width for the board to be sawn, in a manner known per se.

Detector systems of other types than the one described above can also be used for detecting the light impulses, e.g., systems of the type which are based on the difference in intensity when the light is reflected from a deficient edge or the plane surface. The mirror can be replaced by a lens to produce a parallel scan.

What is claimed is:

1. A device for measuring the width of a board, which comprises a laser tube emitting a beam of laser radiation; a rotating mirror means positioned so as to receive said laser beam and to impart a scanning motion thereto; optical reflector means so positioned that said rotating mirror means is at the focal point of the reflector means and that the reflector means reflects the laser beam from the rotating mirror means in a direction along said board; to scan the laser beam laterally there across; a plurality of mirror rasters positioned as mirror groups successively at predetermined spaced intervals along the length of the board at a certain distance therefrom and at a given angle so as to reflect the laser beam coming from the reflector means onto parts of the board that are situated stepwise in the lateral direction of the board; and a plurality of detectors including at least one detector at each of said intervals as defined by said group of mirrors, and arranged to receive laser pulses reflected from the board surface, to thereby provide information about the board width at said interval.

2. A device according to claim 1, further comprising at least one detector at each of said intervals for directly receiving a laser beam coming from one of said mirrors of the mirror rasters a laser beam coming from one of said mirrors of the mirror rasters and passing by an edge of said board.

3. A device according to claim 1, further comprising detector means positioned at the beginning and at midway of the reflector means for distinguishing between two successive measurements and between the measurement information from the two sides of the board.

4. A device according to claim 1, further comprising lens means positioned between the laser tube and the rotating mirror means and converting the cross section of the laser beam from a circular cross section into an elongate cross section.

5. A device according to claim 1, including a lens for producing a parallel scan of the laser beam.

* * * * *